United States Patent
Cierniak (10) Patent No.: US 10,127,288 B1
(45) Date of Patent: *Nov. 13, 2018

(54) DISPLAY OF SOCIAL CONTENT

(71) Applicant: Google LLC, Mountain View, CA (US)

(72) Inventor: Michal Cierniak, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/218,696

(22) Filed: Jul. 25, 2016

Related U.S. Application Data (63) Continuation of application No. 12/940,602, filed on Nov. 5, 2010, now Pat. No. 9,432,242.

(51) Int. Cl.
```
G06F 15/16      (2006.01)
G06F 17/30      (2006.01)
H04L 29/08      (2006.01)
G06F 17/22      (2006.01)
```

(52) U.S. Cl.
CPC ...... *G06F 17/3053* (2013.01); *G06F 17/2247* (2013.01); *G06F 17/30554* (2013.01); *H04L 67/02* (2013.01)

(58) Field of Classification Search
CPC .......................... G06F 17/3053; G06F 17/2247
USPC .................................................. 709/204, 225
See application file for complete search history.

(56) References Cited

U.S. PATENT DOCUMENTS

| | | | |
|---|---|---|---|
| 8,010,619 B1 * | 8/2011 | Lawler | H04L 51/32 709/200 |
| 2009/0125511 A1 | 5/2009 | Kumar | |

FOREIGN PATENT DOCUMENTS

| | | | | |
|---|---|---|---|---|
| EP | 1288795 | | 3/2003 | |
| EP | 1288795 A1 * | 3/2003 | ....... G06F 17/30867 |

* cited by examiner

*Primary Examiner* — Suraj Joshi
*Assistant Examiner* — Joel Mesa
(74) *Attorney, Agent, or Firm* — Fish & Richardson P.C.

(57) ABSTRACT

In general, one aspect of the subject matter described in this specification can be embodied in methods that include identifying social content related to online content for display to a user, determining social content providers associated with the identified social content, calculating quantities based on the user's interaction with each of the respective social content providers, and displaying at least some of the social content based on the calculated quantities. Other embodiments of this aspect include corresponding systems, apparatus, and computer program products.

17 Claims, 8 Drawing Sheets

DISPLAY OF SOCIAL CONTENT

CROSS-REFERENCE TO RELATED APPLICATIONS

This application is a continuation application of, and claims priority to, U.S. patent application Ser. No. 12/940,602, titled "DISPLAY OF SOCIAL CONTENT," filed on Nov. 5, 2010. The disclosure of the foregoing application is incorporated herein by reference in its entirety for all purposes.

BACKGROUND

The present disclosure relates to the display of social content.

Typical social content providers allow individual users to contribute content for distribution to other users of the social content providers or to the general public. An individual user may receive content from multiple social content providers, contribute content to multiple social content providers, and have links to other others of social content providers. Further, some of that content may be related to other content available online, e.g., web pages.

SUMMARY

This specification describes technologies relating to display of social content. In general, one aspect of the subject matter described in this specification can be embodied in methods that include identifying social content related to online content for display to a user, determining social content providers associated with the identified social content, calculating quantities based on the user's interaction with each of the respective social content providers, and displaying at least some of the social content based on the calculated quantities. Other embodiments of this aspect include corresponding systems, apparatus, and computer program products.

These and other embodiments can each optionally include one or more of the following features. The user's interaction with the social content providers includes creating member content on one or more of the social content providers. The user's interaction with the social content providers comprises establishing relationships between the user and other users of one or more of the social content providers. Displaying at least some of the social content based on the calculated quantities further includes assigning, for each respective social content provider, a numerical score for the social content associated with that social content provider based on a relationship between the user and the respective social content provider, and displaying at least some of the social content ordered based on the numerical scores. The social content has been assigned numerical scores based on one or more relationships between the social content and the online content. The methods, systems, apparatus, and computer program products also include accessing a user account associated with one of the social content providers, the user account belonging to the user. The social content is displayed with the online content.

Particular embodiments of the invention can be implemented to realize one or more of the following advantages. Social content can be arranged and displayed in a manner useful to a user. In particular, social content from social sources that is inferred to be preferred by the user can be weighted more highly than social content from other social sources.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Online content, for example, web pages, news stories, or blog posts, can be augmented with related content from social sites. When a user accesses the online content, related social content can be displayed with the online content. For example, the particular social content shown, and the order in which it is shown, can be determined according to a process that calculates a relationship between the online content and the social content and calculates a degree to which the social content is relevant.

A particular user may prefer the content of some social content providers over the content of other social content providers. The social content to display can be determined not only by how the social content relates to the online content being viewed, but also by an inference of the user's preferences among multiple social content providers. One way to infer a particular user's preferences is to examine the user's interaction with social content providers (e.g., which social content providers are used by the user) and to calculate the user's preferences based on the interaction information.

For situations in which the systems discussed here collect personal information about users, the users may be provided with an opportunity to opt in/out of programs or features that may collect personal information (e.g., information about a user's preferences or a user's contributions to social content providers). User may also be informed of the accompanying limitations on the functionality of a service that may result from limiting access to such personal information. In addition, certain data may be anonymized in one or more ways before it is stored or used, so that personally identifiable information is removed. For example, a user's identity may be anonymized so that the no personally identifiable information can be determined for the user and so that any identified user preferences or user interactions are generalized (for example, generalized based on user demographics) rather than associated with a particular user.

Figure 1:
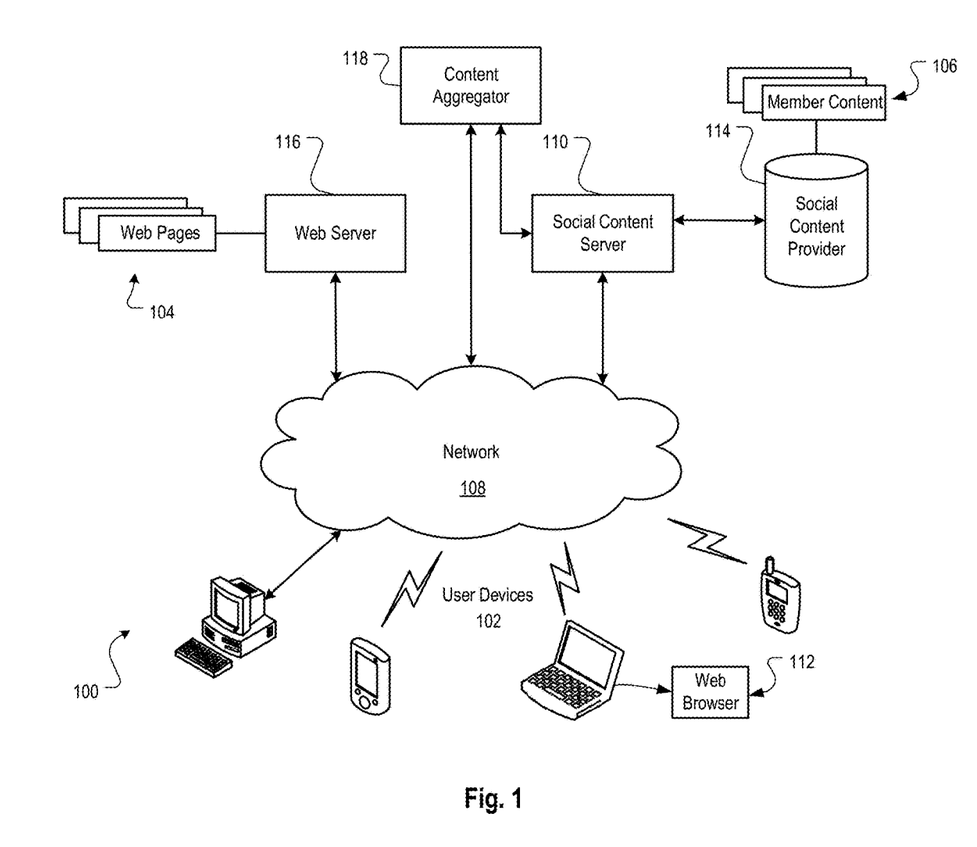
FIG. 1 is a block diagram of an example online environment.

FIG. 1 is a block diagram of an example online environment 100. The online environment 100 facilitates the serving of content items for display on user devices 102. For example, content items can include web pages 104 and member content 106 (e.g., content created by individual users).

Web pages 104 and member content 106 can be accessed by user devices 102 through the network 108. The network 108 can be a wide area network, local area network, the Internet, or any other public or private network, or combination of both.

For example, a particular user can access content maintained by a social content provider 114 through a social content server 110. Member content 106 can be requested when the user device 102 connects to the social content server 110 and requests the member content 106. The member content 106 includes member-generated content from each individual user that interacts with the social content provider 114 (e.g., members of a social site).

A social content provider (e.g. social content provider 114) is a service that allows users who are members of the social content provider to participate by interacting with other members, for example, by contributing content and receiving content from other members. In some examples, a social content provider may be a social networking site. In some examples, member content may be a status message, a microblog message, multimedia content, shared content originating from a source other than the member providing the content, or another kind of member content. In some examples, a member provides content to one or more other specific members, and in some examples, a member provides content for consumption by a general audience rather than specific members.

In some implementations, the member content 106 is content intended for general consumption by any member of the social content provider 114, for example, or by any online member who has access to the social content provider 114. In some other implementations, the member content 106 is content intended for a specific member or a specific subset of members of the social content provider 114. For example, a member may be associated with specific other members by connections established in the social content provider (e.g., as designated by the member). The member can choose to contribute content intended for or directed to one or more of those associated members.

Additionally, a particular user can access content from one or more web pages 104 through a corresponding web server 116. User devices 102 can connect to the web server 116 or the social content server 110 through the network 108 using any device capable of communicating in a computer network environment and displaying retrieved information. Example user devices 102 include a web-enabled handheld device, a mobile telephone or smartphone, tablet device, a set top box, a game console, a personal digital assistant, a navigation device, or a computer.

Although only one web server 116 and one social content provider 114 are shown, user devices 102 can access any number of web servers and social content providers available on the network 108.

The member content 106 can also be requested as part of the delivery of a web page 104 in response to a user device 102 requesting the web page 104 from a web server 116. For example, the member content 106 can be displayed with the web page 104 on a web browser 112 of a user device 102.

In some implementations, the member content 106 is identified by a content aggregator 118. The content aggregator 118 evaluates the member content 106 to identify member content to associate with a requested web page 104. In some examples, when the user device 102 requests the web page 104 from the web server 116, software (e.g. the web browser 112 or software operating in association with the web browser) operating on the user device 102 consults the content aggregator 118. The content aggregator 118 determines what member content 106, if any, to display with the web page 104. In some implementations, the content aggregator 118 receives the member content 106 sent/transmitted by a social content server 110 and provides the member content 106 to the user device 102 or provides a reference to the member content 106 to the user device 102, e.g., a hyperlink to the member content 106, or a URL associated with the member content 106.

Figure 2:
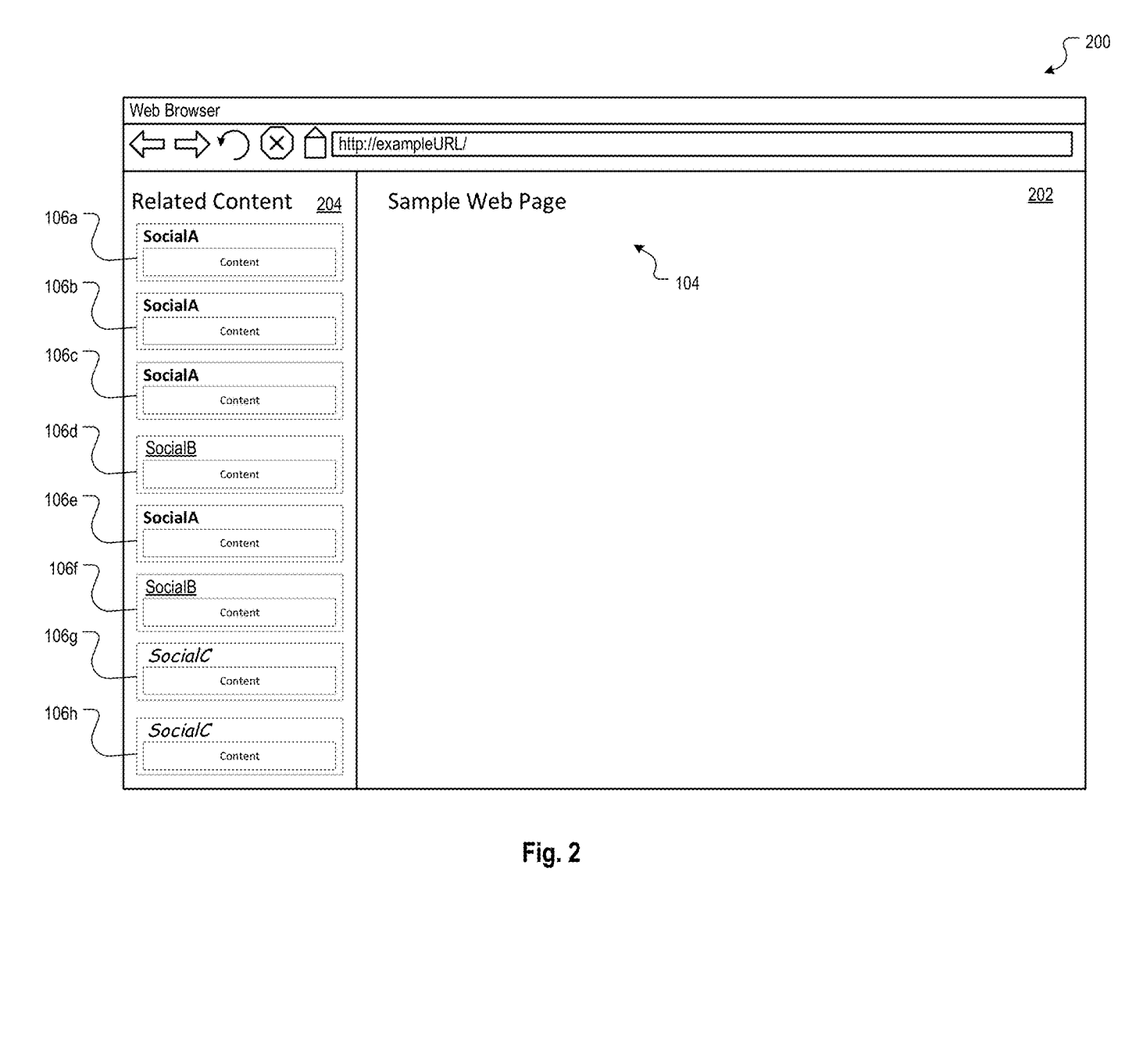
FIG. 2 is an example of online content including social content displayed in a web browser.

FIG. 2 is an example of online content including social content displayed in a web browser 200. The web browser 200 includes a browsing pane 202 for displaying requested content (e.g., a web page 104) and a related content pane 204, e.g., for displaying member content 106a-h from one or more social content providers. The member content 106a-h has been identified (e.g., by a content aggregator 118 as shown in FIG. 1) as related to the particular content displayed within the web page 104. For example, the member content 106a-h can include keywords that also appear in the web page 104, or the member content can contain links to the web page (e.g. hyperlinks to a uniform resource locator of the web page). In some implementations, the browsing pane 202 displays other kinds of online content in addition to or instead of a web page 104. For example, the browsing pane 202 can display other social content or multimedia content, for example images or streaming video. In some implementations, the browsing pane 202 is absent and the related content pane 204 is displayed contemporaneously with the delivery of non-visual content, for example, music or other audio.

In some implementations, the related content pane 204 is a feature of the web browser 200. For example, the related content pane 204 may be generated by web browser software. In some implementations, the related content pane 204 is generated by software that is separate from, and operating in association with, the web browser 200. For example, the related content pane 204 can be generated by a web browser "plug-in" or other kind of add-on software. In some implementations, the related content pane 204 is generated by a web server and provided to the web browser 200. For example, the related content pane 204 may be online member content delivered to the web browser 200 (e.g. by a content aggregator 118 as shown in FIG. 1) at about the same time that a web page 104 is delivered to the web browser 200 by a web server.

In the example shown, the member content is associated with three social content providers, "SocialA," "SocialB," and "SocialC." Some of the member content 106a-c from SocialA appears first in the related content pane 204. Some of the member content 106d, 106f from SocialB appears farther down in the related content pane 204, and the member content 106g, 106h from SocialC appears last in the related content pane 204. In some implementations, there is other member content of these social content providers or of other social content providers that can be viewed by the user, e.g., by scrolling down in the related content pane 204 using a scroll bar (not shown).

The member content 106a-h may be ordered according to a combination of factors. For example, the member content can be assigned numerical scores, in which content having a higher score appears higher in the related content pane 204 than content having a lower score. The numerical score may be calculated based on multiple factors, one or more of which can have associated weights.

In some implementations, the score assigned to the member content is determined partially based on content age, so that the newest content appears first in the related content pane 204. In some implementations, the score assigned to the member content is determined partially based on relevance, so that the content deemed most relevant to the web page 104 (e.g., as determined by a relevancy algorithm) appears first in the related content pane 204. In some other implementations, the score assigned to the member content is determined partially based on the social content provider which the content is associated with.

Figure 3A:
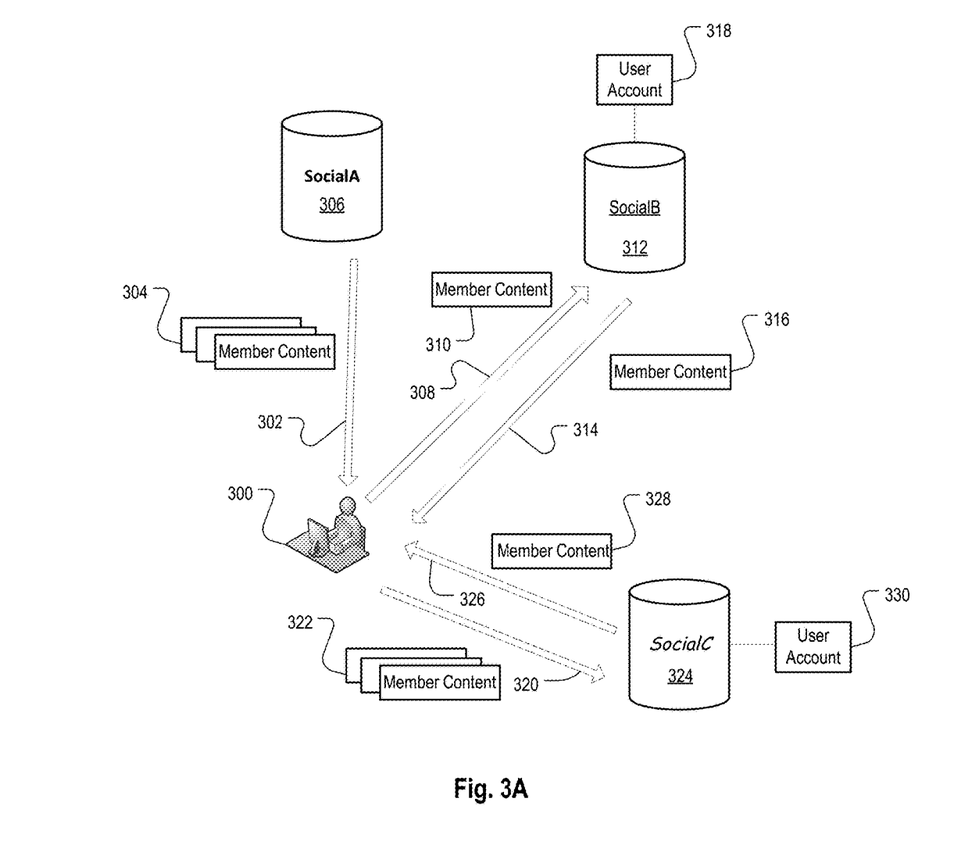
FIG. 3A is a diagram illustrating an example of a user's interaction with social content providers.

FIG. 3A is a diagram illustrating an example of a user's interaction with social content providers. A user 300 may interact with multiple social content providers. For example, the user 300 may be a member of multiple social content providers and may create and receive content from the social content providers. The interaction of the user 300 with the social content providers may indicate information about the relationship between the user 300 and content associated with the social content provider including content form one or more other members.

In one example of an interaction, the user 300 can receive 302 a large amount of member content 304 (e.g. content from members other than user 300) from SocialA 306, a social content provider. For example, SocialA 306 may include a large amount of content of interest to the user 300, or SocialA may transmit content more frequently than other social content providers.

In another example of an interaction, the user 300 may contribute 308 his own member content 310 to SocialB 312, another social content provider. The contributed member content 310 can then be received by other members of SocialB 312 or the public at large, if SocialB allows for general dissemination of member content. The user 300 can also receive 314 other member content 316 from SocialB 312 associated with one or more other members. In this example, the member content 316 received from SocialB 312 is smaller in quantity than the member content 304 from SocialA 306. SocialB 312 can include less member content available than SocialA 306, for example. Alternatively, the user 300 can have a user account 318 associated with SocialB that includes settings that filter the member content 316 received from SocialB. In some implementations, the contributed member content 310 is associated with the user account 318 belonging to the user 300. For example, SocialB 312 may use the user account 318 to identify the user 300 relative to other members and to allow limited access to the member content 310, for example, depending on privacy or security settings established by the user 300 and stored in association with the user account 318.

In another example of an interaction, the user 300 can contribute 320 a large amount of his own member content 322 to SocialC 324, another social content provider. The contributed member content 322 can then be received by other members of SocialC 324, for example, by particular members allowed by the user 300 to view the content, or the public at large, if SocialC allows for general dissemination of member content. The amount of member content 322 contributed to SocialC 324 is larger in quantity than the member content 310 contributed to SocialB 312. The user 300 can also receive 326 other member content 328 from SocialC 324. In this example, the member content 316 received from SocialC 324 is smaller in quantity than the member content 304 received from SocialA 306, and about the same in quantity as the member content 316 received from SocialB 312. In some implementations, the contributed member content 322 associated with SocialC 324 is associated with a user account 330 belonging to the user 300.

Figure 3B:
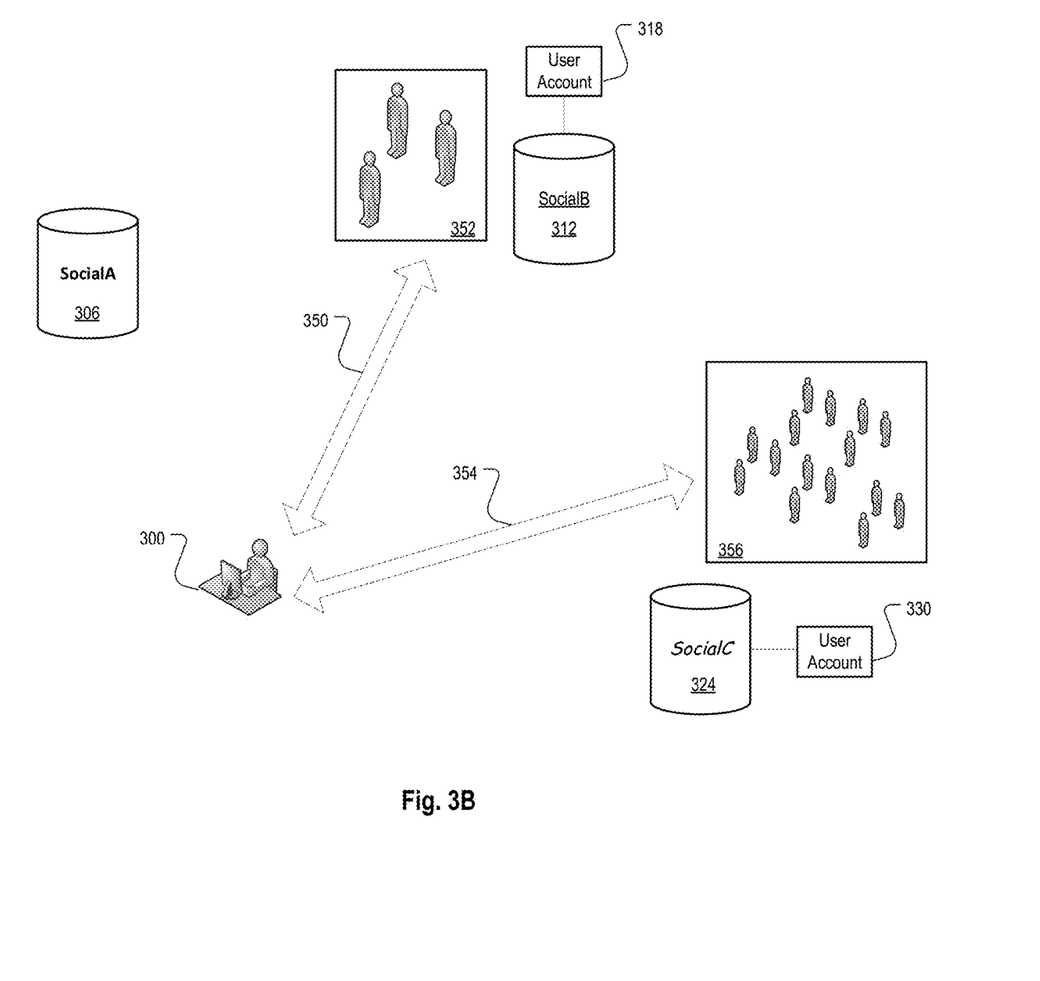
FIG. 3B is a diagram illustrating an example of a user's interaction with social content providers.

FIG. 3B is a diagram illustrating an example of a user's interaction with social content providers. A user 300 can interact with members on each of multiple social content providers, for example, by establishing connections with other members to form associations within the respective social content providers. The connections with other members represent relationships between the member and the other members. In some examples, the relationships within the context of the social content providers correspond to real-world relationships. For example, a member may be associated with other members who are friends, relatives, co-workers, and other real-world relations and acquaintances.

Such associations with other members are optional. For example, the user 300 may receive content from SocialA 306, but the user need not be associated with any other members of SocialA 306. In some examples, the user 300 only receives content from SocialA 306. In some examples, the user 300 contributes and receives content to SocialA 306, but the content is not intended for or directed to any particular members.

In an example of an interaction with other members, the user 300 can be connected 350 to other members 352 of SocialB 312. For example, a user account 318 belonging to the user 300 can be associated with stored data that describes the connections between the user 300 and the other members 352. In some implementations, some member content contributed by the user 300 (e.g. some of the member content 310 as shown in FIG. 3A) is intended for or directed to some of the other members 352 connected to the user 300. In some implementations, some member content received by the user (e.g. some of the member content 316 as shown in FIG. 3A) originates from some of the other members 352 connected to the user 300.

In another example of an interaction with other members, the user 300 can be connected 354 to other members 356 of SocialC 324 (e.g. by connections associated with the user account 330 belonging to the user 300). The user 300 can be connected to many more other members 356 of SocialC 324 than other members 352 of SocialB 312. In some examples, the user 300 can be interested in more content available on SocialC 324, and so the user 300 has spent more time accessing SocialC 324 and subsequently has established more associations with members of SocialC 324 (including, for example, members who share interests with the user 300).

Figure 4:
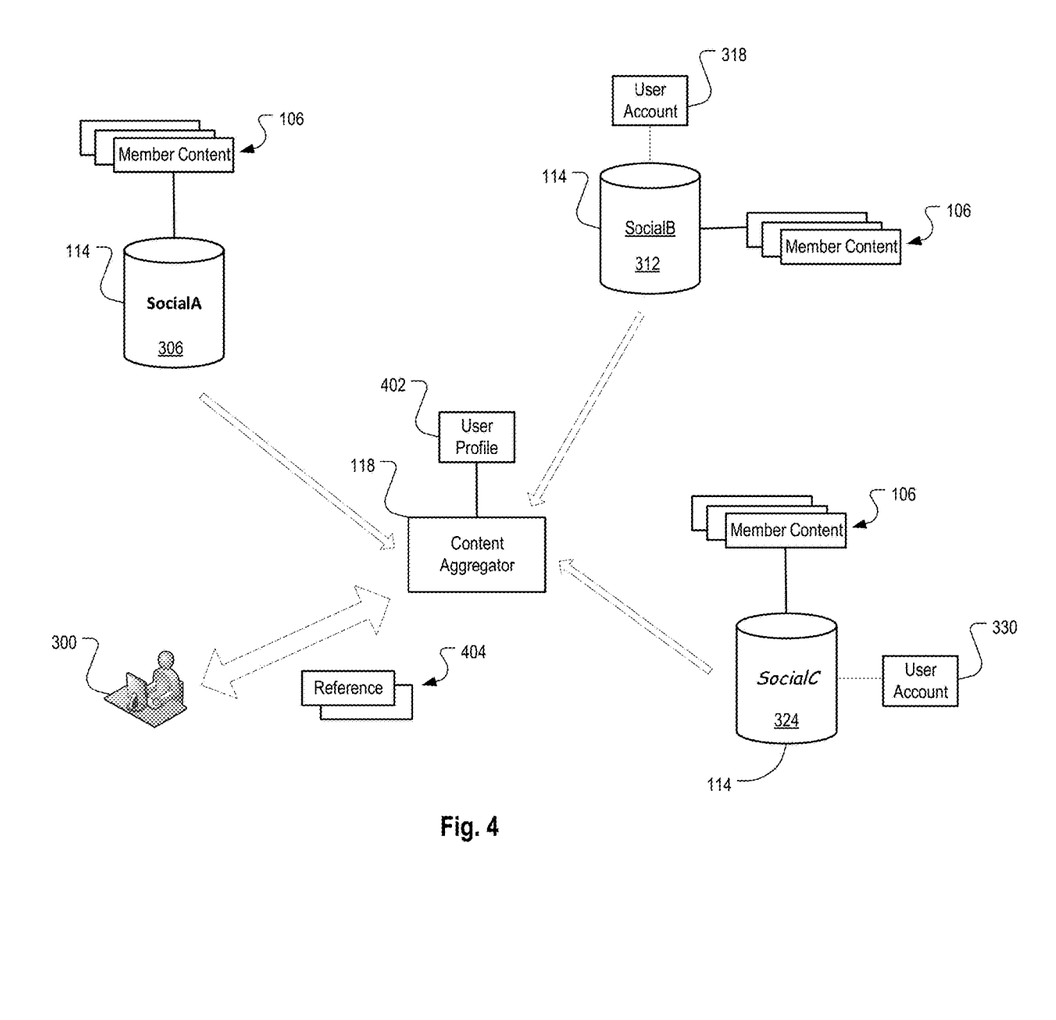
FIG. 4 is an example diagram illustrating a content aggregator's interaction with social content providers

FIG. 4 is an example diagram illustrating a content aggregator 118 and social content providers 114. In some implementations, a content aggregator 118 can evaluate the member content 106 of multiple social content providers 114, e.g. SocialA 306, SocialB 312, and SocialC 324. For example, the content aggregator 118 can evaluate the member content 106, to determine whether and to what degree the member content may be of interest to a user 300. The content aggregator 118 may combine member content 106 of multiple social content providers 114 into a single collection of data, or the content aggregator 118 may maintain a separate collection of data from each social content provider. In some implementations, the content aggregator 118 does not retain information about the social content provider 114 which member content 106 is associated with. In some implementations, the content aggregator 118 does not retain information that identifies the member that created member content 106.

In some implementations, the content aggregator 118 is associated with a user profile 402 associated with the user 300. For example, the user profile 402 can be associated with stored data indicating which social content providers 114 the user 300 contributes to or receives content from, information about the user's interests and preferences, or other information about the user. In some examples, the user profile 402 is associated with stored data that can be used to receive information about user accounts associated with the social content providers 114. For example, the user profile 402 may store one or more user logins and passwords associated with social content providers 114 and belonging to the user 300. In some examples, the user profile 402 is a user account belonging to the user 300, and in some examples, the user profile 402 is compiled by the content aggregator 118. In some examples, the user profile 402 can store the user's preference to opt-out of certain specified social content providers, and the content aggregator will not store information from those social content providers specified by the user.

The content aggregator 118 can evaluate the member content 106 according to several criteria. For example, if the user is viewing online content, the content aggregator 118 can determine which member content 106 relates to the online content requested for viewing by the user, and choose from the related member content. In some implementations, the content aggregator 118 identifies keywords within the member content 106 that also appear in the online content, or identifies links within the member content 106 that point to the online content, e.g. hyperlinks to a web page. If member content 106 from multiple social content providers 114 is available, the content aggregator 118 can determine which social content providers 114 provide content are likely to provide member content 106 of interest to the user.

In some implementations, the content aggregator 118 infers which social content providers 114 the user 300 prefers based on interactions between the user 300 and the social content providers 114. For example, referring to the example of FIG. 3A, if the user 300 contributes more content to SocialC 324 than he contributes to SocialB 312, the user may prefer the content provided by SocialC 324 to the content provided by SocialB 312 (e.g. because the user is more interested in the topics or format of content associated with SocialC 324). If the user does not contribute any content to SocialA 306, the user may be less interested in the content provided by SocialA 306.

In some implementations, the number of connections between the user 300 and other members of a social content provider indicates a degree to which the user 300 is interested in the member content 106 provided by that particular social content provider For example, referring to the example of FIG. 3B, if the user 300 has connections to more members of SocialC 324 than the user 300 has connections to members of SocialB 312, the user may prefer the content provided by SocialC 324 to the content provided by SocialB 312. If the user does not have any connections to any members of SocialA 306, and/or does not have a user account associated with SocialA 306, the user may be less interested in the content provided by SocialA 306. In some implementations, the frequency at which the user 300 accesses a social content provider or accesses content provided by a social content provider indicates a degree to which the user 300 is interested in the member content 106 provided by that particular social content provider.

The content aggregator 118 can use these criteria to quantify the value of the member content 106. For example, the content aggregator 118 can assign numerical scores to the member content 106. In some implementations, the content aggregator 118 calculates numerical scores weighted based on the degree to which the member content 106 is evaluated to be of interest to a user, e.g. based on which social content provider provides the member content 106 or the user's interactions with that particular social content provider.

Once the content aggregator 118 has determined which member content 106 may be of interest to the user 300, the content aggregator 118 can provide this information about the member content 106 to the user 300. For example, the content aggregator 118 can provide one or more member content references 404, e.g. hyperlinks to the member content 106, URLs associated with the member content 106, portions or other representations of the member content 106, or other kinds of references of the same type or multiple types.

Figure 5:
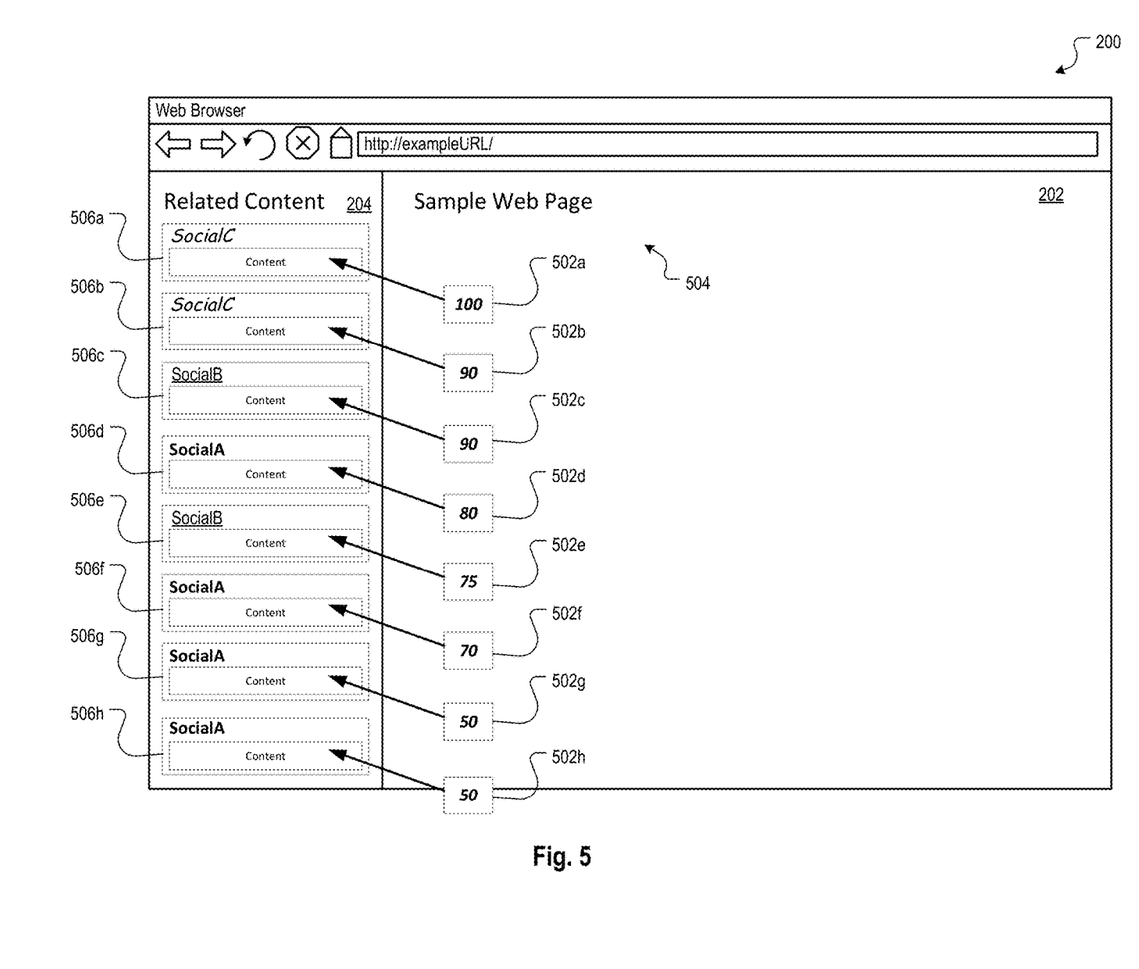
FIG. 5 is an example of online content including social content displayed in a web browser and ordered based on the user's interaction with social content providers.

FIG. 5 is an example of online content including social content displayed in a web browser 200 and ordered based on the user's interaction with social content providers. The web browser 200 includes the browsing pane 202 for displaying a web page 504 and a related content pane 204 for displaying related member content 506a-h from social content providers. The related member content 506a-h has been ordered based on the interaction between a user (e.g. user 300 as shown in FIG. 3A and FIG. 3B) and social content providers, e.g. SocialA 306, SocialB 312, and SocialC 324.

In this example, member content 506a, 506b from SocialC 324 appears at the top of the related content pane 204. Member content 506c, 506f from SocialB 312 appears below content from SocialC 324, and member content 506d, 506f-506h from SocialA 306 appears at the bottom of the related content pane 204 below content from SocialC 324 and SocialB 312.

Member content 506a, 506b from SocialC 324 appears at the top of the related content pane 204 because content from SocialC 324 has been determined to be of greatest interest to the user, e.g. as determined by a content aggregator 118 as shown in FIG. 1. For example, the content aggregator 118 can assign numerical scores 02a-502h to each of the respective items of member content 506a-506h. (The numerical scores 502a-506h are shown for the purpose of explanation in FIG. 5 and may not be visible to the user viewing the web browser 200.) Member content 506a, 506b from SocialC 324 has numerical scores highest in value, and because the member content 506a-506h is ordered based on the numerical scores 502a-502h, the member content 506a, 506b from SocialC 324 appears at the top of the related content pane 204.

The numerical scores 502a-502h can be determined according to multiple criteria in addition to the social content provider associated with the content. The way in which scores are calculated according to social content provider may not cause the scores of some social content to exceed the scores of other social content that is highly relevant to the online content. For example, the numerical scores 502a-502h may additionally be calculated based on the degree to which the member content 506a-506h is related to the web page 104. In the example shown in FIG. 5, some member content 506d from SocialA has a higher numerical score 502d than the numerical score 502e of some member content 506e from SocialB, even though the content aggregator 118 has determined that content from SocialA is of less interest to the user than content from SocialB. In this example, the content aggregator 118 may have determined that the item of member content 506d from SocialA is highly related to the web page 104, and has calculated a numerical score 502*d* that reflects the value of this relationship.

Figure 6:
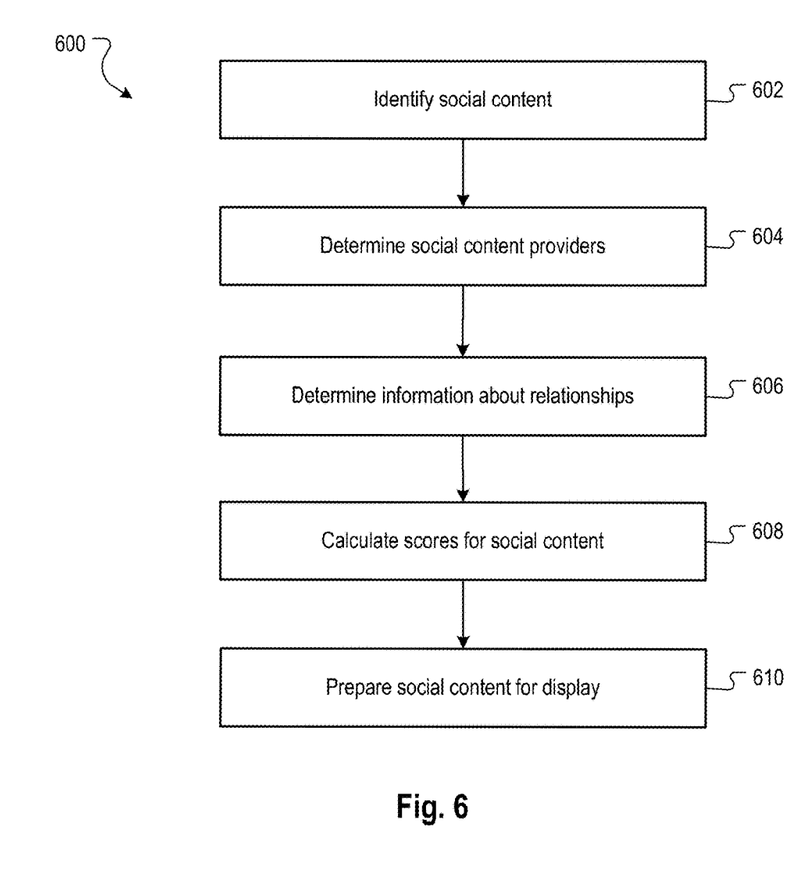
FIG. 6 is a flowchart of an example process of scoring social content for display.

FIG. 6 is a flowchart of an example process 600 of preparing social content for display to a user. The process 600 can be used, for example, by the content aggregator 118 of FIG. 1 to arrange member content 106 according to the social content provider 114.

At stage 602, a content aggregator identifies social content.

At stage 604, the content aggregator determines the social content providers associated with the social content. For example, the social content may be associated with data identifying the social content provider. In some implementations, the content aggregator previously determined the social content providers when the content aggregator identified or received the social content.

At stage 606, the content aggregator determines (e.g. identifies or receives) information about the relationship between the social content and a user to whom the social content will be displayed. For example, a content aggregator can determine information about the user's interaction with the social content providers to evaluate or infer which social content providers provide content that the user may have a greater interest in viewing.

At stage 608, the content aggregator calculates scores for the social content with respect to the user. For example, if social content is associated with a social content provider that has been determined to provide content that is of greater interest to the user, the social content associated with that social content provider can be assigned a higher score than social content associated with a social content provider that has been determined to provide content that is of less interest to the user.

At stage 610, the content aggregator prepares the social content for display based on the calculated scores. In some implementations, scores are assigned to the social content and the social content is ordered based on the scores, for example, in a list in which social content having higher scores is placed higher in the list than social content having lower scores The social content may be displayed in a web browser in association with a web page.

Figure 7:
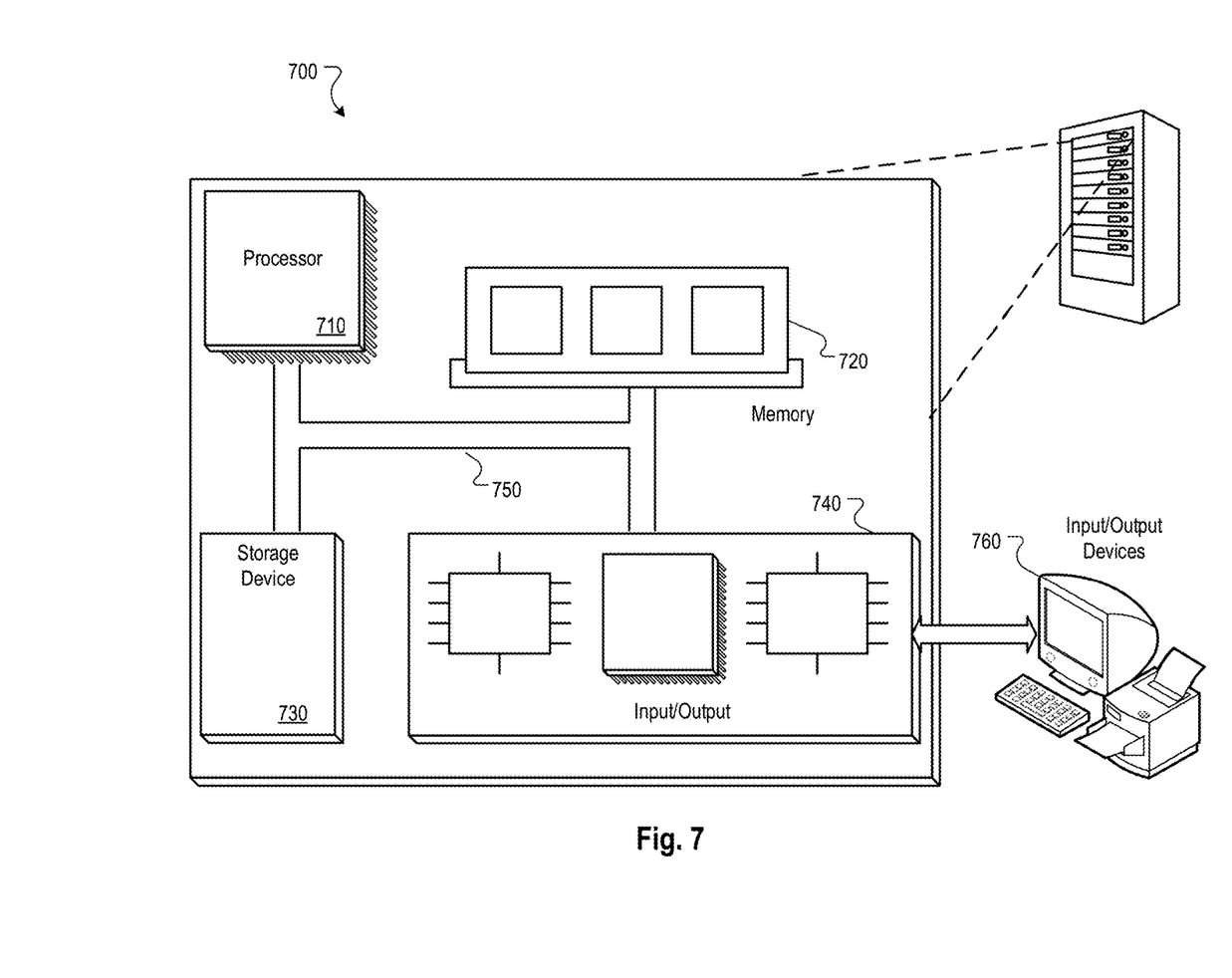
FIG. 7 is block diagram of an example computer system that can be used to facilitate the display of social content.

FIG. 7 is block diagram of an example computer system 700 that can be used to facilitate display of social content, e.g. member content. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, or some other large capacity storage device.

The input/output device 740 provides input/output operations for the system 700. In one implementation, the input/output device 740 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

The web server, social content server, and content aggregator can be realized by instructions that upon execution cause one or more processing devices to carry out the processes and functions described above. Such instructions can comprise, for example, interpreted instructions, such as script instructions, e.g., JavaScript or ECMAScript instructions, or executable code, or other instructions stored in a computer readable medium. The web server and social content server can be distributively implemented over a network, such as a server farm, or can be implemented in a single computer device.

Although an example processing system has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "processing system" encompasses all apparatus, devices, and machines for processing data, including by way of example a programmable processor, a computer, or multiple processors or computers. The processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

Implementations of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method performed by one or more computers, the method comprising:
   receiving a request to provide social content to a user device associated with a user;
   identifying a plurality of social content items, wherein the plurality of social content items include a first set of first social content items published by a first social content provider and a second set of second social content items published by a second social content provider, wherein a social content item is a member-generated content item generated by a member of a social content provider and provided by the social content provider to other members of the social content provider for consumption by the other members;
   determining a first social content provider score based on a first frequency at which the user interacts with social content items published by the first social content provider, and a second social content provider score based on a second frequency at which the user interacts with social content items published by the second social content provider, wherein the second social content provider score is greater than the first social content provider score;
   calculating, for each of the first social content items, a respective final score for the first social content items based on the first social content provider score and at least one other respective score for each first social content item that is a measure of relevance of the first social content item to the request;
   calculating, for each of the second social content items, a respective final score for the second social content items based on the second social content provider score and at least one other respective score for each second social content item that is a measure of relevance of the second social content item to the request, wherein a first other score for a particular first social content item of the first social content items is greater than a second other score for a particular second social content item of the second social content items;
   ranking the plurality of first and second social content items based on respective final scores, wherein the particular first social content item is ranked higher than the particular second social content item based on i) the first other score being greater than the second other score and ii) the second social content provider score being greater than the first social content provider score; and
   providing the plurality of ranked social content items to the user device for presentation according to the ranking.

2. The method of claim 1, wherein the first and the second social content provider scores are further based on an amount of content created by the user on the respective social content provider.

3. The method of claim 1, wherein the first and the second social content provider scores are further based on a number of connections between the user and the other members of the respective social content provider.

4. The method of claim 1, further comprising accessing a user account associated with at least one of the first and the second social content providers, the user account belonging to the user.

5. The method of claim 1, wherein the request is associated with a web page, and wherein the respective measures of relevance of the first and the second social content items to the request is based on one or more keywords that occur in both the web page and the first and the second social content items.

6. The method of claim 1, wherein the request is associated with a web page, and wherein the respective measures of relevance of the first and the second social content items to the request is based on one or more links that occur in the first and the second social content items that point to the web page.

7. A system comprising:
one or more storage devices having instructions stored thereon; and
one or more computers configured to execute the instructions to perform operations comprising:
receiving a request to provide social content to a user device associated with a user;
identifying a plurality of social content items, wherein the plurality of social content items include a first set of first social content items published by a first social content provider and a second set of second social content items published by a second social content provider, wherein a social content item is a member-generated content item generated by a member of a social content provider and provided by the social content provider to other members of the social content provider for consumption by the other members;
determining a first social content provider score based on a first frequency at which the user interacts with social content items published by the first social content provider, and a second social content provider score based on a second frequency at which the user interacts with social content items published by the second social content provider, wherein the second social content provider score is greater than the first social content provider score;
calculating, for each of the first social content items, a respective final score for the first social content items based on the first social content provider score and at least one other respective score for each first social content item that is a measure of relevance of the first social content item to the request;
calculating, for each of the second social content items, a respective final score for the second social content items based on the second social content provider score and at least one other respective score for each second social content item that is a measure of relevance of the second social content item to the request, wherein a first other score for a particular first social content item of the first social content items is greater than a second other score for a particular second social content item of the second social content items;
ranking the plurality of first and second social content items based on respective final scores, wherein the particular first social content item is ranked higher than the particular second social content item based on i) the first other score being greater than the second other score and ii) the second social content provider score being greater than the first social content provider score; and
providing the plurality of ranked social content items to the user device for presentation according to the ranking.

8. The system of claim 7, wherein the first and the second social content provider scores are further based on an amount of content created by the user on the respective social content provider.

9. The system of claim 7, wherein the first and the second social content provider scores are further based on a number of connections between the user and the other members of the respective social content provider.

10. The system of claim 7, the operations further comprising accessing a user account associated with at least one of the first and the second social content providers, the user account belonging to the user.

11. The system of claim 7, wherein the request is associated with a web page, and wherein the respective measures of relevance of the first and the second social content items to the request is based on one or more keywords that occur in both the web page and the first and the second social content items.

12. The system of claim 7, wherein the request is associated with a web page, and wherein the respective measures of relevance of the first and the second social content items to the request is based on one or more links that occur in the first and the second social content items that point to the web page.

13. A storage device having instructions stored thereon that, when executed by one or more computers, cause the one or more computers to perform operations comprising:
receiving a request to provide social content to a user device associated with a user;
identifying a plurality of social content items, wherein the plurality of social content items include a first set of first social content items published by a first social content provider and a second set of second social content items published by a second social content provider, wherein a social content item is a member-generated content item generated by a member of a social content provider and provided by the social content provider to other members of the social content provider for consumption by the other members;
determining a first social content provider score based on a first frequency at which the user interacts with social content items published by the first social content provider, and a second social content provider score based on a second frequency at which the user interacts with social content items published by the second social content provider, wherein the second social content provider score is greater than the first social content provider score;
calculating, for each of the first social content items, a respective final score for the first social content items based on the first social content provider score and at least one other respective score for each first social content item that is a measure of relevance of the first social content item to the request;
calculating, for each of the second social content items, a respective final score for the second social content items based on the second social content provider score and at least one other respective score for each second social content item that is a measure of relevance of the second social content item to the request, wherein a first other score for a particular first social content item of the first social content items is greater than a second other score for a particular second social content item of the second social content items;
ranking the plurality of first and second social content items based on respective final scores, wherein the particular first social content item is ranked higher than the particular second social content item based on i) the first other score being greater than the second other score and ii) the second social content provider score being greater than the first social content provider score; and providing the plurality of ranked social content items to the user device for presentation according to the ranking.

14. The storage device of claim 13, wherein the first and the second social content provider scores are further based on an amount of content created by the user on the respective social content provider.

15. The storage device of claim 13, wherein the first and the second social content provider scores are further based on a number of connections between the user and the other members of the respective social content provider.

16. The storage device of claim 13, wherein the request is associated with a web page, and wherein the respective measures of relevance of the first and the second social content items to the request is based on one or more keywords that occur in both the web page and the first and the second social content items.

17. The storage device of claim 13, wherein the request is associated with a web page, and wherein the respective measures of relevance of the first and the second social content items to the request is based on one or more links that occur in the first and the second social content items that point to the web page.

* * * * *